Jan. 14, 1958  G. B. LONG ET AL  2,820,129
DOMESTIC APPLIANCE
Filed Feb. 2, 1954  2 Sheets-Sheet 1

INVENTORS
George B. Long
BY Byron L. Brucken
G.H.Strickland
Their Attorney

Jan. 14, 1958   G. B. LONG ET AL   2,820,129
DOMESTIC APPLIANCE
Filed Feb. 2, 1954   2 Sheets-Sheet 2
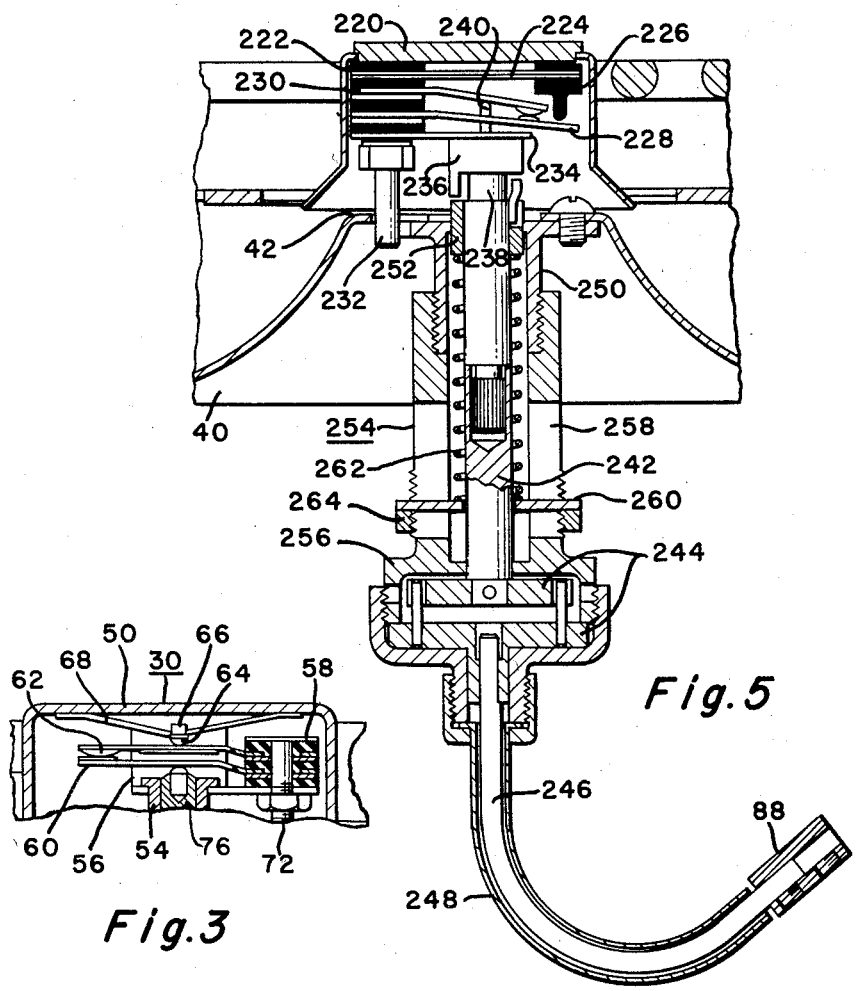
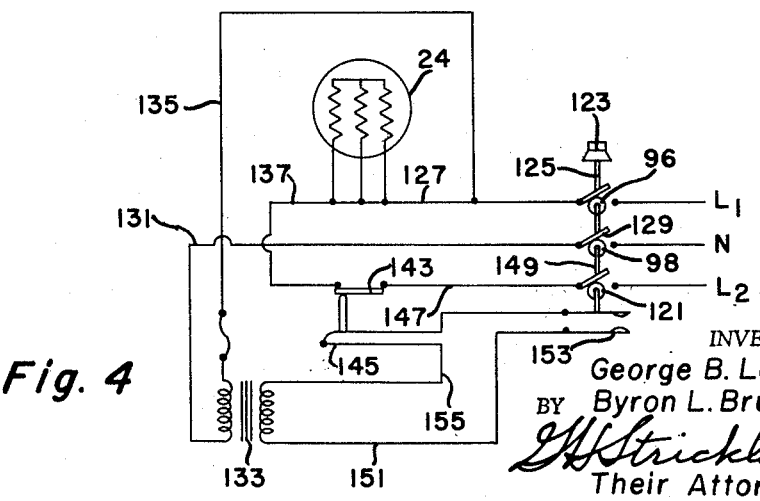
INVENTORS
George B. Long
BY Byron L. Brucken
*G.H.Strickland*
Their Attorney United States Patent Office 2,820,129
Patented Jan. 14, 1958

2,820,129
DOMESTIC APPLIANCE

George B. Long and Byron L. Brucken, Dayton, Ohio, assignors to General Motors Corporation, Detroit, Mich., a corporation of Delaware Application February 2, 1954, Serial No. 407,747

1 Claim. (Cl. 219—20)

This invention relates to a domestic appliance and more particularly to thermostatically controlled surface heaters for domestic electric ranges.

The thermostatic control of the surface heaters of electric ranges is a very desirable feature. Yet this feature has not been incorporated in such ranges to any great extent.

It is an object of our invention to provide an adjustable thermostatic control for the surface heaters of electric ranges which is suitable for mass production and low enough in cost to encourage mass consumption.

It is another object of our invention to provide an improved type of bimetal control directly associated with the surface heater of an electric range and to provide an adjustment means therefor including a knob upon the front of the range top having directly associated therewith suitable "on" and "off" switch mechanisms for deenergizing the heater.

It is another object of our invention to provide an improved type of bimetal control directly associated with the surface heater of an electric range which is controlled by an improved type of relay which will be quiet and durable.

These objects are attained by providing an inverted cup-shaped brass element within the center of the surface heater. The center portion of this element is spanned by an Invar strip which operates a set of spring contacts. These spring contacts are adjusted through a flexible cable and a shaft provided with an adjusting knob on the front of the range top. The shaft extends through a switch portion which is provided with "on" and "off" switches. Associated with the switch portion is a thermal relay of a novel hot wire type which is controlled by the spring mounted contacts within the brass element. This relay has its main contacts connected in series with the surface heater.

Further objects and advantages of the present invention will be apparent from the following description, reference being had to the accompanying drawings, wherein a preferred form of the invention is clearly shown.

In the drawings:

Figure 3 is an enlarged fragmentary view of the thermostatic contact;

Figure 4 is a wiring diagram for the control shown in Figure 2; and

Figure 5 is a fragmentary sectional view showing a modified form of thermal element and adjusting system.

Figure 1:
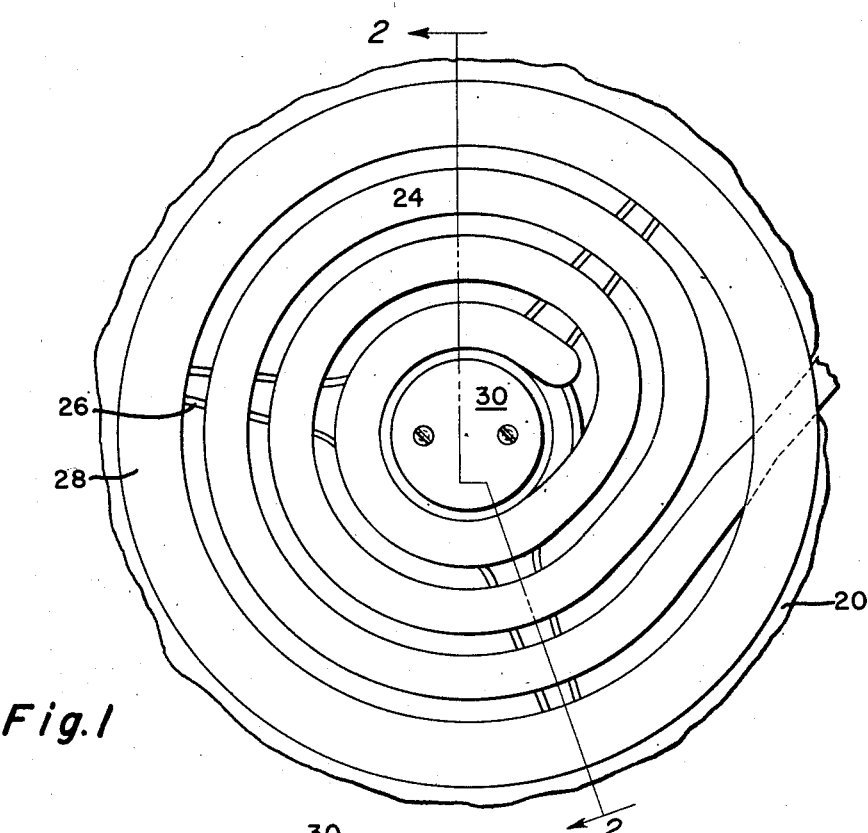
Figure 1 is a top view of a surface heater and thermostatic control embodying one form of our invention.
Figure 2:
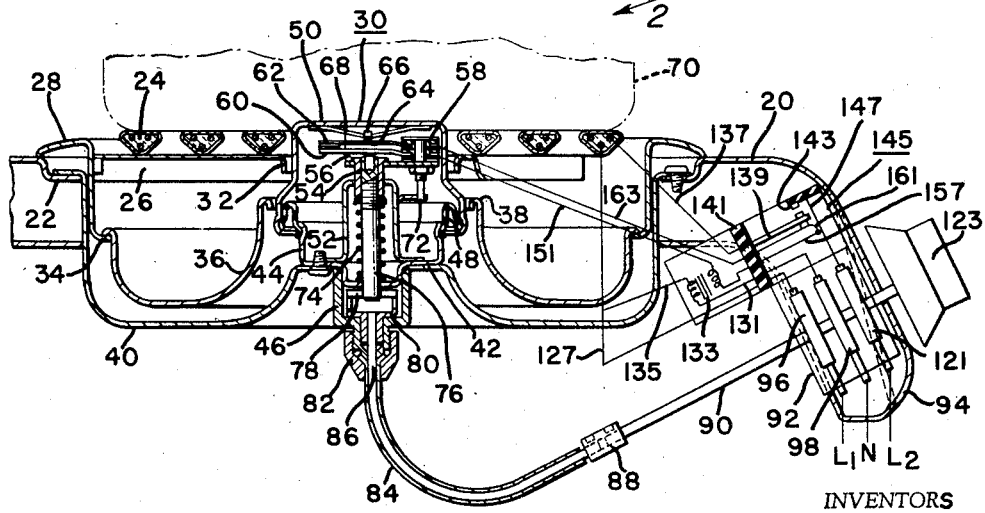
Figure 2 is a sectional view taken substantially along the line 2—2 of Figure 1.

Referring now to the drawings and more particularly to Figures 1 and 2, there is shown a range top 20 of a domestic range provided with a flanged opening 22 for a monotube type of surface heater 24. This monotube surface heater 24 rests upon a three armed support 26 having the ends of its arms supported by the cylindrical wall of a trim ring 28 having a wire upper flange resting upon the range top 20. The surface heater 24 is spiral in shape and extends about the central thermostatic control 30. The three armed support 26 is provided with a central opening 32 within which is mounted the thermostatic control 20. The trim ring 28 is provided in its lower portion with an inturned flange 34 upon which is supported the drip collector 36 having an upwardly flanged central opening 38 surrounding the thermostatic control 30.

Resting upon the flange 22 is an outwardly flanged bowl-shaped support 40 having an upturned inwardly flanged opening 42. Mounted upon this inwardly flanged opening 42 is a double flanged cup-shaped member 44 having a nipple 46 threaded onto its lower flange. Its upper flange is connected by an annular sealing member 48 of a suitable rubber-like material with the lower flange of an inverted brass cup-shaped member 50.

Also supported by the flange 42 is an inverted cup-shaped member 52 which at its upper end carries a threaded sleeve 54. This threaded sleeve carries a support 56 which is fastened to the inverted brass cup-shaped element 50.

The support 56 carries an insulated mounting assembly 58 including a lower spring contact arm 60 and an upper spring contact arm 62. As better shown in Figure 3 the upper spring contact arm 62 carries a central bimetal section 64 which tends to cause the element 62 to bow downwardly when heated at a rate of $\frac{1}{1000}$ per inch for each 10° rise in temperature. The elements 60 and 62 have an inherent spring force which tends to separate them. This force, however, is comparatively light. The contact arms 60 and 62 are closed by a button 66 at the center of an Invar strip 68 which spans the top of the element 50 and has its opposite ends fastened to the underside of the element 50 as shown. This Invar strip is made of an alloy steel having a high nickel content which does not materially expand with changes in temperature. Since the brass element 50 expands considerably with changes in temperature, the Invar element 68 will be stretched upon an increase in temperature to raise the button 66 to allow the contact arms 60 and 62 to separate.

When a vessel or receptacle, such as is indicated by the dot and dash lines 70 on Figure 2, is placed on the surface heater 24 it will contact and depress the brass element 50. The sleeve 54 is slidably mounted in the inverted cup-shaped support 52. The annular seal 48 provides a resilient spring force which normally maintains the element 50 firmly in contact with the bottom of the receptacle 70. The insulated mounting 58 is fastened by a bolt 72 to the platform 56. The bolt 72 extends downwardly and extends into a notch on a projection extending from the support 52 as shown to prevent rotation of the element 50 and the platform 56.

Extending between the bottom of the sleeve 54 and the bottom of the member 42 is a light spring 74 which urges the sleeve 54, the support 56 and the element 50 upwardly against the bottom of the receptacle 70 when located on the surface heater 24 as indicated by the dot and dash lines. Within this spring 74 is a screw 76 which threads into the sleeve 54. The lower end of this screw is provided with a transverse pin 78 received in the transverse slot in the coupling 80. This coupling member 80 is rotatably mounted within the nipple 46. A gland nut 82 closes the bottom of the nipple 80. This gland nut 82 also connects to the outer casing 84 of a flexible shaft 86 which connects directly with the coupling 80. This flexible shaft 86 is connected by a second coupling 88 with an extended knob shaft 90 of the "on-off" control switch 92 which is mounted directly behind the turned down front 94 of the range top 20.

This switch box 92 includes terminals connecting directly with the supply conductors L₁, N and L₂. The knob shaft 90 is provided with the "on-off" cams 96, 98 and 121 which are fixed to the shaft 90 and rotated by the knob 123 located on the front end of the shaft which projects through the front 94 of the range top 20. These cams 96, 98 and 121 open the contacts with the supply conductors L₁, N and L₂ in the "off" position of the knob 123. In the other positions of the knob 123 the cam 96 allows its switch contact member 125 to close and contact the supply conductor L₁ through the conductor 127 with one terminal of the surface heater 24. The cam 98 opens the switch contact 129 in the "off" position of the knob 123 but in all other positions closes the switch element 129 to connect the supply conductor in with the conductor 131 which connects to one terminal of the transformer 133. The second terminal of the transformer 133 is connected by the conductor 135 to the conductor 127.

The second terminal of the surface heater 24 is connected by the conductor 137 to a thin metal contact carrying element 139 extending as a cantilever arm forming a base 14 of insulating material. The cantilever arm 139 carries a contact and its outer end is adapted to make contact with a stationary contact 143 of a hot wire type relay generally designated by the reference character 145. The contact 143 is connected by the conductor 147 to the switch member 149 which is operated by the cam 121. This cam 121 opens the switch member 149 in the "off" position but in all other positions connects the conductor 147 to the supply conductor L₂. The relay 145 is controlled by the contact arms 60 and 62. The one low voltage terminal of the transformer 133 is connected by the conductor 151 to the contact member or blade 153 while the other low voltage terminal of the transformer 133 is connected by the conductor 155 to a hot wire element 157. One end of this hot wire 157 is fastened to the insulating base 141. The other end is fastened to the end of a cantilever spring arm 161 having its opposite end mounted in the base 141 and connected by a conductor 163 with the contact member 62. The spring arm 161 has an inherent spring force tending to cause it to bow in a counterclockwise direction about its base. It is connected by a block of electrical insulating material with the free end of the contact arm 139. When the hot wire 157 stretches the spring which is in the spring arm 161 it will cause it to bow to the right thus moving the contact arm 139 into engagement with the contact 143 to close the circuit of the surface heater 24. When the hot wire 157 cools it will pull the spring arm 161 in the clockwise direction to separate the contact arm 139 from the contact 143 to deenergize the surface heater.

In operation the receptacle or cooking vessel is placed in the surface heater 24 thus depressing the element 50 and making firm contact with the element 50 as well as the upper surface of the surface heater 24. The knob 123 is turned from its "off" position to whatever temperature is selected for the vessel 70. This will turn the knob shaft 90 as well as the cams 96, 98 and 121 to close the switches 125, 129 and 149. The flexible shaft or cable 86 will also be rotated to rotate the coupling 80, the pin 78 and the screw 76. The rotation of the screw 76 will raise the button at its upper end an amount corresponding to the temperature selected. The raising of the button will raise the lower contact member 60 a corresponding amount so that the temperature of the brass element at which the contacts 60 and 62 are opened will be seleced by this physical positioning.

The adjustment may be between a range of 100° to 550° F. The brass element 50 will be cold at the start and will cause the Invar element 68 to be bowed outwardly so that its button 66 will push the contact member 62 into engagement with the contact member 60 to close the low voltage six volt circuit of the transformer 133.

This will cause current to flow through the hot wire 157 thereby heating this wire and causing it to expand. Preferably this hot wire member 157 is one which lengthens rapidly with increasing temperatures and contracts rapidly with decreasing temperatures. The expansion of this hot wire element 157 will allow the spring arm 161 to bow in a counterclockwise direction to move the contact arm 131 into engagement with the contact 143 to close the circuit for the surface heater 24. This will cause the surface heater 24 to convert electrical energy into heat to heat the vessel 70. The heating of the vessel 70 will heat the brass element 50 and gradually reduce the bow in the Invar element 68. The bimetal portion 64 of the contact arm 62 will not rise in temperature as rapidly as the element 50 so that on the initial cycle it will be substantially uneffected. The rise in temperature of the surface vessel 70 will gradually cause a rise in temperature of the brass element 50 sufficient to flatten the Invar element 68 sufficiently that the buttons 66 will move upwardly to allow the contact elements 62 and 60 to separate to deenergize the low voltage six volt circuit on the low side of the transformer 133. The hot wire element 157 will cool and contract thereby pulling the contact element 139 away from the stationary contact 143 to deenergize the surface heater 24.

The bimetal portion 64 of the contact element 62 however lags behind at temperatures of the receptacle 70 and the brass element 50 so that its temperature will continue to rise during the "off" cycle. The deenergizing of the surface heater 24 will not immediately stop the rise in temperature of the vessel 70 and the brass element 50 but the stored heat in the element 24 will continue the rise in temperature for a brief period. This additional rise in temperature is taken into account in the temperature markings upon the knob 123. The compensating bimetal 64 becomes effective during the "off" cycle and bows downwardly to assist in hastening the reclosing of the contacts 62 and 60 during the "off" cycle so that the reclosing of the hot wire circuit 157 is at a higher temperature of the vessel 70 than the initial opening of the contacts 62 and 60. This arrangement makes possible the cycling of the contacts 62 and 60 substantially in a constant range. Without this compensator 64 the control would tend to overshoot on the initial cycle and then subsequently cycle at a lower temperature.

In Figure 5 is shown a modified form of temperature controlled adjustable contacts which are adapted to be connected to the conductors 151, 153 to control the relay of 145 in the same manner as illustrated in Figures 1 to 4. In Figure 5 there is provided an inverted cup-shaped member 220 located in the center portion of the surface heater generally and substantially in the same manner as shown in Figures 1 and 2. Upon the under surface of this inverted cup-shaped member 220 is an insulation assembly 222 which supports a cantilever arm bimetal member 224. The end of this bimetal arm 224 is provided with a button 226 of electrical insulating material adapted to engage the extended portion of a spring contact arm 228 mounted in cantilever fashion upon the insulated assembly 222. This arm 228 may be connected to the conductor 151 as shown in Figures 2 and 4. Above the cantilever arm 228 is a second cantilever arm 230 adapted to be connected to the conductor 163 as shown in Figures 2 and 4. At its outer end this spring arm 230 is provided with a contact adapted to cooperate with the contact upon the spring arm 228. These arms 230 and 228 have an inherent spring force which causes them to bow toward each other and close the contacts.

The insulated mounting 222 is held together by a bolt 232 having a downward extension. This insulating mounting also has an arm 234 located beneath the spring arm 228 to which is fastened a stop member 236. Threaded within this stop member 236 is a screw 238 which has a pin 240 extending through an aperture in the contact arm 228 and into engagement with the contact arm 230. This screw is connected through a splined connection with a coupling shaft 242 connecting with the coupling 244. The coupling 244 connects to the flexible coupling 246 within the coupling housing 248. This flexible contact 246 is adapted to be connected to the coupling 88 and the knob shaft 90 as shown in Figure 2.

A supporting element 250 is fastened to the flange 42 of the bowl-shaped support 40. The support 250 has a notch which receives the lower end of the bolt 232 to prevent its rotation when the screw 238 is turned by the flexible coupling 246. A collar 252 is fastened to the screw 238 and rotates within the support 250. It carries an upwardly extending stop projection cooperating with an interengaging stop projection on the threaded member 236. These interengaging stops limit the rotation of the screw 238 to one revolution.

Fastened to the lower end of the support 250 is a mounting member 254 which at its lower end provides a housing 256 for the coupling 244. This housing 254 is provided with vertical slots 258. A spring retainer 260 surrounds the housing portion 254 and has arms extending through the slots 258. The inner ends of these arms support the lower end of the coil spring 262. The upper end of this coil spring 262 bears against the collar 252. The force of the spring 262 is transmitted through the collar 252 to the screw 238 and the threaded member 236. The threaded member 236 transmits the spring force through the arm 234 and the insulated support 222 to the member 220. This keeps the member 220 firmly in contact with the bottom of the vessel on the surface heater 24 as in Figures 1 and 2.

The force of the spring 262 is adjusted by a nut 264 which is threaded onto the outside of the housing 254 directly beneath the lower spring retainer 260.

In operation the rotation of the knob shaft 90 from the "off" position turns the flexible coupling 246, the coupling 244, the shaft 242 and 238 to move the projection 240 to a position corresponding to the temperature desired. The projection 240 will locate the upper contact member 230 correspondingly. At this time the bimetal 224 will be cold so that the button 226 will be moved upwardly against the adjacent surface of the member 220. When member 220 reaches the temperature selected corresponding to the location of the contact member 220 the bimetal 224 will bow downwardly to separate the contact members 230 and 228 in the same manner as the contacts 60 and 62 separate in Figure 2, to control the surface heat. Either contact arm 230 or 228 may be made of a bimetal to arrange to bow toward each other with an increase in temperature in the same manner as accomplished by the bimetal in Figures 2 and 3.

While the form of embodiment of the invention as herein disclosed constitutes a preferred form, it is to be understood that other forms might be adopted, as may come within the scope of the claim which follows.

What is claimed is as follows:

An electric range including a range top, an electric surface heater mounted upon the range top, a resiliently mounted contact device within said surface heater adapted to make thermal contact with the bottom of a vessel resting upon the surface heater, said contact device including an adjustable bimetal switch means responsive to the temperature to said contact device, said switch means including adjustment means for adjusting its operating temperature, a rotatable adjusting knob and shaft means rotatably mounted upon said range top, means connecting said shaft means and the adjustment means of said adjustable bimetal switch means, said range top being provided with a switch box adjacent said adjusting knob provided with a first set of electrical terminals for connection to a supply source and a second set of electrical terminals for connection to said surface heater, conductors connecting said second set of terminals and said heater and said bimetal switch means for energizing said heater, said switch box including switches actuated by said shaft means connecting said first and second sets of terminals in one portion of the rotation of the shaft means and disconnecting said sets at a different position in the rotation of the shaft means, said switch box also having physically associated with it a transformer having a low voltage outlet and a relay connected in circuit with said low voltage outlet and said switch means and controlled by said bimetal switch means, said relay having high voltage contacts electrically connected between one of said switches and one of said second set of terminals for energizing and deenergizing said heater.

References Cited in the file of this patent
UNITED STATES PATENTS

| | | |
|---|---|---|
| 1,461,878 | Harvey | July 17, 1923 |
| 1,626,515 | Cook | Apr. 26, 1927 |
| 1,979,082 | Schwedenberg et al. | Oct. 30, 1934 |
| 2,137,073 | Bletz | Nov. 15, 1938 |
| 2,140,479 | Myers et al. | Dec. 13, 1938 |
| 2,288,510 | Brannon | June 30, 1942 |
| 2,331,535 | Candor | Oct. 12, 1943 |
| 2,387,460 | Myers | Oct. 23, 1945 |
| 2,424,412 | Myers | July 22, 1947 |
| 2,584,924 | Reingruber | Feb. 5, 1952 |
| 2,678,379 | Fry | May 11, 1954 |